(12) United States Patent
Lavid Ben Lulu et al.

(10) Patent No.: US 11,243,524 B2
(45) Date of Patent: Feb. 8, 2022

(54) SYSTEM AND METHOD FOR UNSUPERVISED ROOT CAUSE ANALYSIS OF MACHINE FAILURES

(71) Applicant: Presenso, Ltd., Haifa (IL)

(72) Inventors: David Lavid Ben Lulu, Nesher (IL); David Almagor, Keisarya (IL)

(73) Assignee: Presenso, Ltd., Haifa (IL)

( * ) Notice: Subject to any disclaimer, the term of this patent is extended or adjusted under 35 U.S.C. 154(b) by 353 days.

(21) Appl. No.: 16/027,797

(22) Filed: Jul. 5, 2018

(65) Prior Publication Data

US 2018/0348747 A1 Dec. 6, 2018

Related U.S. Application Data

(63) Continuation of application No. PCT/US2017/012306, filed on Jan. 5, 2017.
(Continued)

(51) Int. Cl.
*G06N 20/00* (2019.01)
*G05B 23/02* (2006.01)
(Continued)

(52) U.S. Cl.
CPC ....... *G05B 23/0281* (2013.01); *G05B 13/048* (2013.01); *G05B 23/0229* (2013.01);
(Continued)

(58) Field of Classification Search
CPC ............ G05B 23/0281; G05B 23/0275; G05B 13/048; G05B 23/0229; G07C 3/14; G06N 3/088; G06N 20/00
See application file for complete search history.

(56) References Cited

U.S. PATENT DOCUMENTS 5,566,092 A 10/1996 Wang et al.
6,343,261 B1 1/2002 Iwanowski et al.
(Continued)

FOREIGN PATENT DOCUMENTS

WO 2002018879 A1 3/2002
WO 2014145977 A1 9/2014
WO 2015104691 A3 11/2015

OTHER PUBLICATIONS

The International Search Report and The Written Opinion for PCT/US2016/065115, ISA/RU, Moscow, Russia, dated Mar. 16, 2017.
(Continued)

*Primary Examiner* — Eyob Hagos
(74) *Attorney, Agent, or Firm* — M&B IP Analysts, LLC

(57) ABSTRACT

A system and method for unsupervised root cause analysis of machine failures. The method includes analyzing, via at least unsupervised machine learning, a plurality of sensory inputs that are proximate to a machine failure, wherein the output of the unsupervised machine learning includes at least one anomaly; identifying, based on the output at least one anomaly, at least one pattern; generating, based on the at least one pattern and the proximate sensory inputs, an attribution dataset, the attribution dataset including a plurality of the proximate sensory inputs leading to the machine failure; and generating, based on the attribution dataset, at least one analytic, wherein the at least one analytic includes at least one root cause anomaly representing a root cause of the machine failure.

18 Claims, 9 Drawing Sheets

Related U.S. Application Data

(60) Provisional application No. 62/293,003, filed on Feb. 9, 2016.

(51) Int. Cl.
*G05B 13/04* (2006.01)
*G07C 3/14* (2006.01)
*G06N 3/08* (2006.01)

(52) U.S. Cl.
CPC ......... *G05B 23/0275* (2013.01); *G06N 3/088* (2013.01); *G06N 20/00* (2019.01); *G07C 3/14* (2013.01)

(56) References Cited

U.S. PATENT DOCUMENTS

| | | | |
|---|---|---|---|
| 6,983,210 | B2 | 1/2006 | Matsubayashi et al. |
| 6,993,417 | B2 | 1/2006 | Osann |
| 7,276,915 | B1 | 10/2007 | Euler et al. |
| 7,317,404 | B2 | 1/2008 | Cumeralto et al. |
| 7,346,433 | B2 | 3/2008 | Budike |
| 7,423,546 | B1 | 9/2008 | Aisa |
| 7,451,017 | B2 | 11/2008 | McNally |
| 7,460,930 | B1 | 12/2008 | Howell et al. |
| 7,463,986 | B2 | 12/2008 | Hayes |
| 7,605,698 | B2 | 10/2009 | Moriwaki |
| 7,840,383 | B2 | 11/2010 | Wang |
| 8,255,090 | B2 | 8/2012 | Frader-Thompson et al. |
| 8,468,380 | B2 | 6/2013 | Munjal et al. |
| 8,644,166 | B2 | 2/2014 | Xia et al. |
| 8,649,987 | B2 | 2/2014 | Steenberg et al. |
| 8,665,061 | B2 | 3/2014 | Kagan et al. |
| 10,425,702 | B2 * | 9/2019 | Trainor .................. G06Q 10/00 |
| 2002/0091972 | A1 | 7/2002 | Harris et al. |
| 2007/0239629 | A1 * | 10/2007 | Ling .................... G05B 23/024 |
| | | | 706/12 |
| 2009/0006295 | A1 | 1/2009 | Angell et al. |
| 2012/0022805 | A1 * | 1/2012 | Teixeira ............... A61B 5/7203 |
| | | | 702/50 |
| 2012/0290879 | A1 | 11/2012 | Shibuya et al. |
| 2013/0060524 | A1 * | 3/2013 | Liao ................... G05B 23/0254 |
| | | | 702/184 |
| 2014/0351642 | A1 * | 11/2014 | Bates ................. G06F 11/0709 |
| | | | 714/26 |
| 2015/0074023 | A1 * | 3/2015 | Gu .......................... G06N 3/08 |
| | | | 706/12 |
| 2015/0160096 | A1 * | 6/2015 | Patrick ...................... F23N 5/16 |
| | | | 702/35 |
| 2015/0313529 | A1 | 11/2015 | Nevo et al. |
| 2016/0232116 | A1 * | 8/2016 | Bone .................. H04L 63/0428 |
| 2016/0342903 | A1 * | 11/2016 | Shumpert ............. G06F 11/079 |
| 2017/0091868 | A1 * | 3/2017 | Trainor .................. G06N 5/04 |
| 2017/0091870 | A1 * | 3/2017 | Trainor ................. G06Q 40/08 |
| 2017/0284896 | A1 * | 10/2017 | Harpale ................ G01M 15/14 |

OTHER PUBLICATIONS

The International Search Report and The Written Opinion for PCT/US2017/012306, ISA/RU, Moscow, Russia, dated Apr. 20, 2017.

The International Search Report and The Written Opinion for PCT/US2017/012833, ISA/RU, Moscow, Russia, dated Apr. 13, 2017.

The International Search Report and Written Opinion of PCT/US2017/012708, ISA/RU, Moscow, Russia, dated Mar. 16, 2017.

* cited by examiner

SYSTEM AND METHOD FOR UNSUPERVISED ROOT CAUSE ANALYSIS OF MACHINE FAILURES

CROSS-REFERENCE TO RELATED APPLICATIONS

This application is a continuation of International Application No. PCT/US2017/12306 filed Jan. 5, 2017 which claims the benefit of U.S. Provisional Application No. 62/293,003 filed on Feb. 9, 2016, the contents of which are hereby incorporated by reference.

TECHNICAL FIELD

The present disclosure relates generally to maintenance systems for machines, and more specifically to identifying root causes of machine failures.

BACKGROUND

Communications, processing, cloud computing, artificial intelligence, and other computerized technologies have advanced significantly in recent years, heralding in new fields of technology and production. Further, many of the industrial technologies employed since or before the 1970s are still used today. Existing solutions related to these industrial technologies have typically seen minor improvements, thereby increasing production and yield only slightly.

In modern manufacturing practices, manufacturers must often meet strict production timelines and provide flawless or nearly flawless production quality. As a result, these manufacturers risk heavy losses whenever an unexpected machine failure occurs. A machine failure is an event that occurs when a machine deviates from correct service. Errors, which are typically deviations from the correct state of the machine, are not necessarily failures, but may lead to and indicate potential future failures. Besides failures, errors may otherwise cause unusual machine behavior that may affect performance.

The average failure-based machine downtime for typical manufacturers (i.e., the average amount of time in which production shuts down, either in part or in whole, due to machine failure) is 17 days per year, i.e., 17 days of lost production and, hence revenue. In the case of a typical 450 megawatt power turbine, for example, a single day of downtime can cost a manufacturer over $3 million US in lost revenue. Such downtime may have additional costs related to repair, safety precautions, and the like.

In energy power plants, billions of US dollars are spent annually on ensuring reliability. Specifically, billions of dollars are spent on backup systems and redundancies utilized to minimize production downtimes. Additionally, monitoring systems may be utilized to identify failures quickly, thereby speeding up the return to production when downtime occurs. However, existing monitoring systems typically identify failures only after or immediately before downtime begins.

Further, existing solutions for monitoring machine failures typically rely on a set of predetermined rules for each machine. These rules sets do not account for all data that may be collected with respect to the machine, and may only be used for checking particular key parameters while ignoring the rest. Moreover, these rules sets must be provided in advance by engineers or other human analysts. As a result, only some of the collected data may be actually used by existing solutions, thereby resulting in wasted use of computing resources related to transmission, storage, and processing of unused data. Further, failure to consider all relevant data may result in missed or otherwise inaccurate determination of failures.

Additionally, existing solutions often rely on periodic testing at predetermined intervals. Thus, even existing solutions that can predict failures in advance typically return requests to perform machine maintenance even when the machine is not in immediate danger of failing. Such premature replacement results in wasted materials and expenses spent replacing parts that are still functioning properly. Further, such existing solutions often determine failures only after failure occurs. As a result, such failures may not be prevented, resulting in down time and lost revenue.

Further, existing monitoring and maintenance solutions often require dedicated testing equipment. Consequently, these solutions typically require specialized operators who are well-trained in the operation of each monitoring and maintenance system. Requiring specialized operators can be inconvenient and costly, and may introduce potential sources of human error. Additionally, given the sheer amount of data that may be collected for any given machine in addition to minute fluctuations in data, a human analyst is not capable of adequately determining upcoming failures.

Moreover, existing solutions for monitoring machine performance are typically configured to only monitor particular types of machines and/or sensors. As a result, such existing monitoring solutions cannot be utilized for other types of machines and sensors. Further, any changes to a machine and/or its sensors (e.g., replacing a machine with a different type of machine, replacing an engine of a machine with a different engine, etc.) may result in inaccurate monitoring using such existing solutions.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for unsupervised root cause analysis of machine failures. The method comprises: analyzing, via at least unsupervised machine learning, a plurality of sensory inputs that are proximate to a machine failure, wherein the output of the unsupervised machine learning includes at least one anomaly; identifying, based on the output at least one anomaly, at least one pattern; generating, based on the at least one pattern and the proximate sensory inputs, an attribution dataset, the attribution dataset including a plurality of the proximate sensory inputs leading to the machine failure; and generating, based on the attribution dataset, at least one analytic, wherein the at least one analytic includes at least one root cause anomaly representing a root cause of the machine failure.

Certain embodiments disclosed herein also include a non-transitory computer readable medium having stored thereon instructions for causing a processing circuitry to perform a process, the process comprising: analyzing, via at least unsupervised machine learning, a plurality of sensory inputs that are proximate to a machine failure, wherein the output of the unsupervised machine learning includes at least one anomaly; identifying, based on the output at least one anomaly, at least one pattern; generating, based on the at least one pattern and the proximate sensory inputs, an attribution dataset, the attribution dataset including a plurality of the proximate sensory inputs leading to the machine failure; and generating, based on the attribution dataset, at least one analytic, wherein the at least one analytic includes at least one root cause anomaly representing a root cause of the machine failure.

Certain embodiments disclosed herein also include a system for unsupervised root cause analysis of machine failures. The system comprises: a processing circuitry; and a memory, the memory containing instructions that, when executed by the processing circuitry, configure the system to: analyze, via at least unsupervised machine learning, a plurality of sensory inputs that are proximate to a machine failure, wherein the output of the unsupervised machine learning includes at least one anomaly; identify, based on the output at least one anomaly, at least one pattern; generate, based on the at least one pattern and the proximate sensory inputs, an attribution dataset, the attribution dataset including a plurality of the proximate sensory inputs leading to the machine failure; and generate, based on the attribution dataset, at least one analytic, wherein the at least one analytic includes at least one root cause anomaly representing a root cause of the machine failure.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
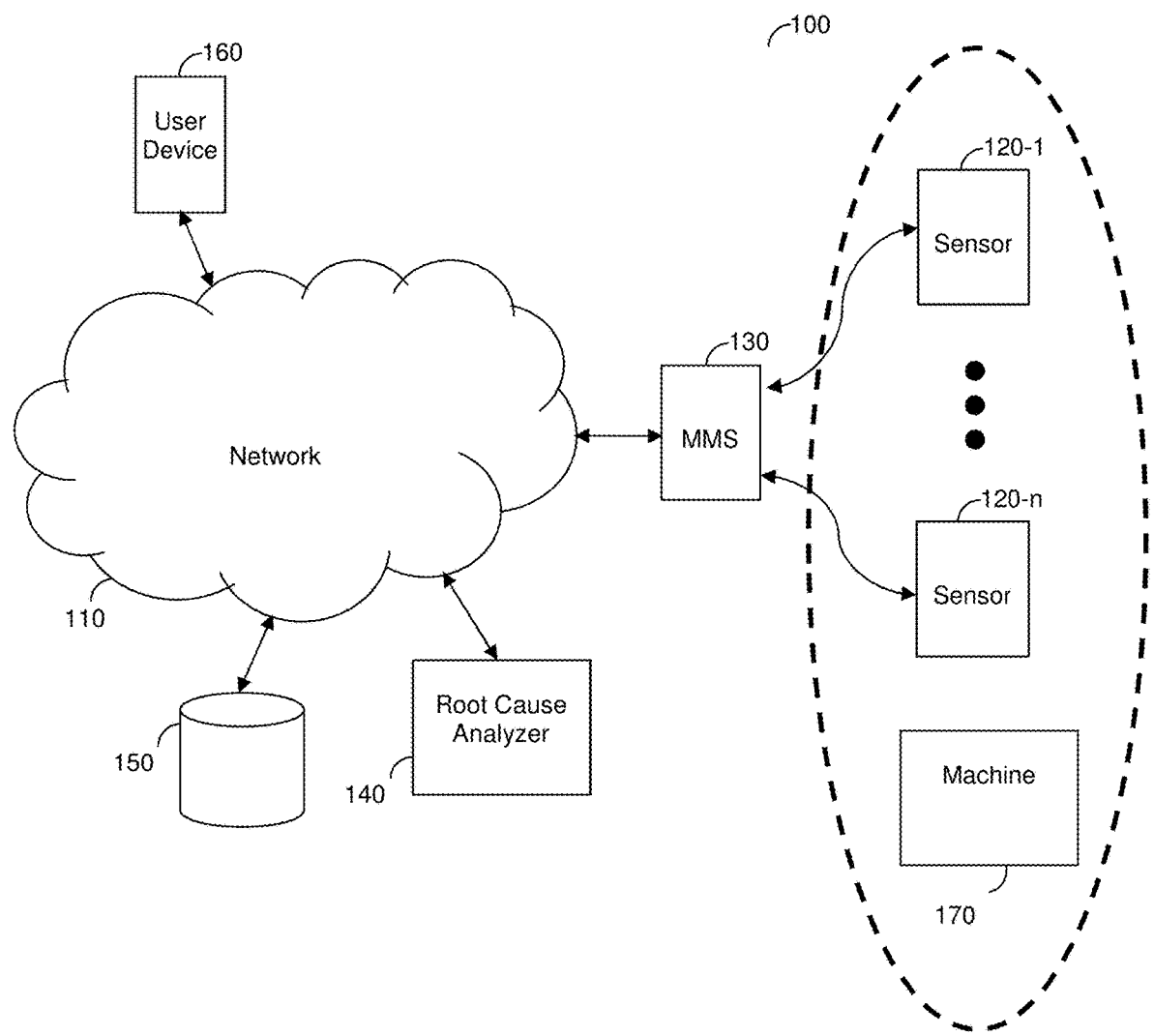
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for unsupervised root cause analysis of machine failures. Sensory inputs associated with a machine are received from a plurality of sensors configured to capture data related to operation of the machine. When a machine failure is identified, at least a portion of the sensory inputs received prior to the failure are analyzed via unsupervised machine learning. The unsupervised machine learning analysis includes at least detecting anomalies in the analyzed sensory inputs. Based on the unsupervised machine learning analysis, an attribution dataset including at least the sensory inputs leading to the failure is determined. Based on the attribution dataset, one or more analytics including a root cause of the failure is determined. In some embodiments, a recommendation for avoiding re-occurrence of the failure may be generated.

The unsupervised machine learning analysis may further include modeling the sensory inputs and detecting indicators in the sensory inputs. The modeling may include generating meta-models for each component, module, or portion of the machine. The meta-models are monitored to detect indicators therein. Based on the indicators, root causes of the machine failures may be determined. In a further embodiment, a behavioral model utilized for predicting machine failures may be generated based on the determined root causes.

FIG. 1 shows an example network diagram 100 utilized to describe the various disclosed embodiments. The example network diagram 100 includes a machine monitoring system (MMS) 130, a root cause analyzer 140, a database 150, and a user device 160 communicatively connected via a network 110. The example network diagram 100 further includes a plurality of sensors 120-1 through 120-$n$ (hereinafter referred to individually as a sensor 120 and collectively as sensors 120, merely for simplicity purposes), communicatively connected to the machine monitoring system 130. The network 110 may be, but is not limited to, a wireless, a cellular or wired network, a local area network (LAN), a wide area network (WAN), a metro area network (MAN), the Internet, the worldwide web (WWW), similar networks, and any combination thereof.

The user device 160 may be, but is not limited to, a personal computer, a laptop, a tablet computer, a smartphone, a wearable computing device, or any other device capable of receiving and displaying notifications indicating results of root cause analysis, results of unsupervised analysis of machine operation data, or both.

The sensors 120 are located in proximity (e.g., physical proximity) to a machine 170. The machine 170 may be any machine for which performance can be represented via sensory data such as, but not limited to, a turbine, an engine, a welding machine, a three-dimensional (3D) printer, an injection molding machine, a combination thereof, a portion thereof, and the like. Each sensor 120 is configured to collect sensory inputs such as, but not limited to, sound signals, ultrasound signals, light, movement tracking indicators, temperature, energy consumption indicators, and the like based on operation of the machine 170. The sensors 120 may include, but are not limited to, sound capturing sensors, motion tracking sensors, energy consumption meters, temperature meters, and the like. Any of the sensors 120 may be, but are not necessarily, communicatively or otherwise connected to the machine 170 (such connection is not illustrated in FIG. 1 merely for the sake of simplicity and without limitation on the disclosed embodiments).

The sensors 120 are communicatively connected to the machine monitoring system 130. The machine monitoring system 130 may be configured to store and to preprocess sensory inputs received from the sensors 120. Alternatively or collectively, the machine monitoring system 130 may be configured to periodically retrieve collected sensory inputs stored in, for example, the database 150. The preprocessing may include, but is not limited to, timestamping sensory inputs, de-trending, rescaling, noise filtering, a combination thereof, and the like.

The preprocessing may further include feature extraction. The results of the feature extraction may include features to be utilized by the root cause analyzer 140 during unsupervised machine learning in order to determine attribution datasets illustrating sensory inputs leading to failures. The feature extraction may include, but is not limited to, dimension reduction techniques such as, but not limited to, singular value decompositions, discrete Fourier transformations, discrete wavelet transformations, line segment methods, or a combination thereof. When such dimension reduction techniques are utilized, the preprocessing may result in, e.g., a lower-dimensional space for the sensory inputs. The machine monitoring system 130 is configured to send the preprocessed sensory inputs to the root cause analyzer 140.

In an embodiment, the root cause analyzer 140 is configured to receive, via the network 110, the preprocessed sensory inputs associated with the machine 170 from the machine monitoring system 130. The sensory inputs may be received continuously, and may be received in real-time.

In an embodiment, the root cause analyzer 140 may further store the sensory input data received from the machine monitoring system 130. Alternatively or collectively, the sensory input data may be stored in the database 150. The database 150 may further store sensory inputs (raw, preprocessed, or both) collected from a plurality of other sensors (not shown) associated with other machines (also not shown). The database 150 may further store indicators, anomalous patterns, failure predictions, behavioral models utilized for analyzing sensory input data, or a combination thereof.

In an embodiment, the root cause analyzer 140 is configured to determine one or more root causes of the failure. In a further embodiment, the failure may be identified by analyzing the preprocessed sensory inputs using unsupervised machine learning or by receiving a notification from another system (not shown) indicating a machine failure. In yet a further embodiment, upon identification of the failure, the root cause analyzer 140 is configured to analyze at least a portion of the preprocessed sensory inputs via unsupervised machine learning. The at least a portion of the sensory inputs may include a set of the sensory inputs received proximately (e.g., close in time) to the failure. The analysis may include, but is not limited to, detecting anomalies in the received sensory inputs.

In another embodiment, the root cause analyzer 140 may be configured to identify a type of the failure. Identifying the type of failure may include, but is not limited to, identifying one or more anomalies indicating failure, sending a notification prompting a user to provide an indication of the type of failure, retrieving the type of failure from a system associated with the machine, or a combination thereof. The type of failure may be utilized to, e.g., generate recommendations for avoiding failure.

In an embodiment, based on the unsupervised machine learning for the at least a portion of the preprocessed sensory inputs, the root cause analyzer 140 is configured to generate an attribution dataset for the failure. The attribution dataset includes at least a set of sensory inputs leading to the failure and is typically organized in chronological order. The attribution dataset may also include one or more environmental variables indicating conditions related to the operation of the machine during the collection of the sensory inputs included in the attribution dataset.

In a further embodiment, based on the attribution dataset, the root cause analyzer 140 is configured to generate at least one analytic for the failure. The at least one analytic may indicate, e.g., the root cause of the failure. The root cause may be or may include one or more anomalies preceding or concurrent with one or more of the sensory inputs of the attribution dataset (i.e., the sensory inputs that ended in machine failure). In another embodiment, the root cause analyzer 140 may be configured to generate at least one recommendation for avoiding failure based on the at least one analytics. Each recommendation may be, e.g., a recommendation for preventing the root cause of the failure. As a non-limiting example, when the root cause is an anomaly occurring during parallel operation of machines, the recommendation may indicate that the machines should not operate in parallel.

In an embodiment, the root cause analyzer 140 is configured to analyze the preprocessed sensory inputs or at least a portion thereof via unsupervised machine learning. In a further embodiment, the unsupervised machine learning may include one or more signal processing techniques, implementation of one or more neural networks, or both. It should be noted that different parameters represented by the sensory inputs may be analyzed using different machine learning techniques. For example, a temperature parameter may be analyzed by applying a first machine learning technique to sensory inputs from a temperature sensor, and an energy consumption parameter may be analyzed by applying a second machine learning technique to sensory inputs from an energy consumption gage.

In an embodiment, the root cause analyzer 140 may be configured to automatically select at least one optimal method for detecting indicators in the sensory input data based on, e.g., a type of one or more portions of the data. In a further embodiment, the selection may be based on results from applying a plurality of models to each at least a portion of the sensory input data. In yet a further embodiment, the selection may be based further on a number of false positives in the results.

In a further embodiment, the root cause analyzer 140 is configured to generate a meta-model for at least one portion of the machine 170. Each portion of the machine for which a meta-model is generated may be a component or module (not shown) such as, but not limited to, a pipe, an engine, a portion of an engine, a combination thereof, and the like. Generating a meta-model may include, but is not limited to, selecting a model that optimally indicates anomalies in the sensory inputs for each of the at least one portion of the machine 170. Each of the generated meta-models is utilized to detect anomalies in the behavior of the respective portion of the machine 170.

Utilization of meta-models representing different portions or components of the machine may aid in more accurately or more precisely identifying the root causes of failures. As a non-limiting example, meta-models for a compressor and for a turbine of a gas turbine machine may be utilized to determine whether the compressor, the turbine, or both, are related to a root cause of the failure of the gas turbine.

In an embodiment, the root cause analyzer 140 is configured to generate, in real-time, at least one adaptive threshold for detecting anomalies based on the analysis. In a further embodiment, the root cause analyzer 140 is configured to determine, in real-time, normal behavior patterns for the sensory inputs of the machine 170 or each portion thereof. The adaptive thresholds may be generated based on the determined normal behavior patterns. Generation of adaptive thresholds for detecting anomalies based on normal behavior patterns is described further herein below with respect to FIGS. 3A and 3B.

In an embodiment, based on the detected anomalies, suspected errors may be determined. In a further embodiment, when a suspected error is determined, the root cause analyzer 140 may be configured to generate a notification indicating anomalous activity. In a further embodiment, the root cause analyzer 140 is further configured to send the generated notification to, e.g., the user device 160. Alternatively or collectively, the root cause analyzer 140 may be configured to send the notification to a system (not shown) configured to automatically mitigate failures.

It should be noted that the machine monitoring system 130 as shown in FIG. 1 is described as a separate component from the root cause analyzer 140 merely for simplicity purposes and without limitation on the disclosed embodiments. The machine monitoring system 130 may be incorporated in the root cause analyzer 140 so as to allow the root cause analyzer 140 to obtain and preprocess sensory inputs without departing from the scope of the disclosure.

It should also be noted that the embodiments described herein above with respect to FIG. 1 are discussed with respect to a user device 160 and a machine 170 merely for simplicity purposes and without limitation on the disclosed embodiments. Multiple user devices may receive information related to root causes machine failures without departing from the scope of the disclosure. Additionally, sensory inputs related to multiple machines may be collected to determine root causes of failures of any or all of the machines without departing from the scope of the disclosure.

It should be further noted that the embodiments disclosed herein are not limited to the specific architecture illustrated in FIG. 1 and other architectures may be equally used without departing from the scope of the disclosed embodiments. Specifically, the root cause analyzer 140 may reside in a cloud computing platform, a datacenter, on premises, and the like. Moreover, in an embodiment, there may be a plurality of root cause analyzers operating as described hereinabove and configured to either have one as a standby proxy to take control in a case of failure, to share the load between them, or to split the functions between them.

Figure 2:
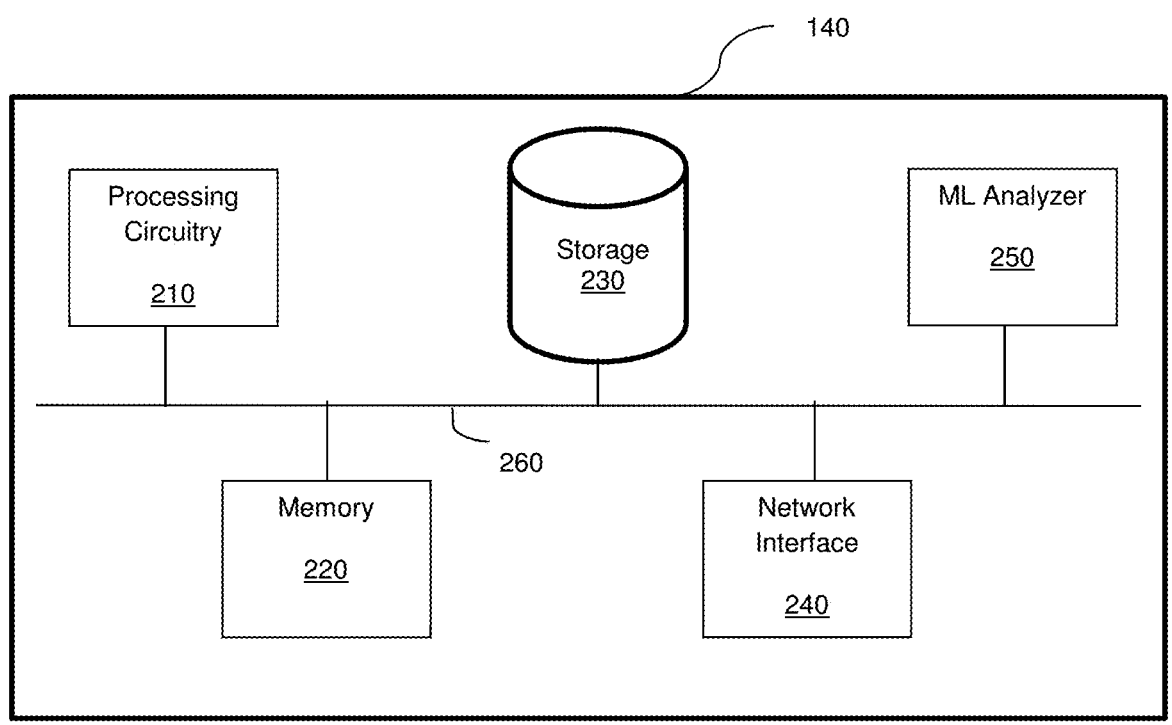
FIG. 2 is a schematic diagram of a machine maintenance system according to an embodiment.

FIG. 2 shows an example block diagram of the root cause analyzer 140 implemented according to one embodiment. The root cause analyzer 140 includes a processing circuitry 210 coupled to a memory 220, a storage 230, a network interface 240, and a machine learning (ML) analyzer 250. In an embodiment, the components of the root cause analyzer 140 may be communicatively connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform unsupervised root cause analysis of machine failures as described herein.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the root cause analyzer 140 to communicate with the machine monitoring system 130 for the purpose of, for example, receiving preprocessed sensory inputs. Additionally, the network interface 240 allows the root cause analyzer 140 to communicate with the user device 160 in order to send, e.g., notifications related to root causes of machine failures, recommendations for avoiding failures, and the like.

The machine learning analyzer 250 is configured to perform unsupervised machine learning based on sensory inputs received via the network interface 240 as described further herein. In an embodiment, the machine learning analyzer 250 is further configured to determine, based on the unsupervised machine learning, root causes of failures. In a further embodiment, the machine learning analyzer 250 is also configured to determine at least one recommendation for avoiding future failures based on the determined root causes. As a non-limiting example, the at least one recommendation may indicate that an exhaust pipe on the machine 170 should be replaced with a new exhaust pipe after a period of time to avoid failure. In another embodiment, the machine learning analyzer 250 may be configured to identify failures based on sensory inputs received via the network interface 240.

It should be understood that the embodiments described herein are not limited to the specific architecture illustrated in FIG. 2, and other architectures may be equally used without departing from the scope of the disclosed embodiments.

Figure 3A:
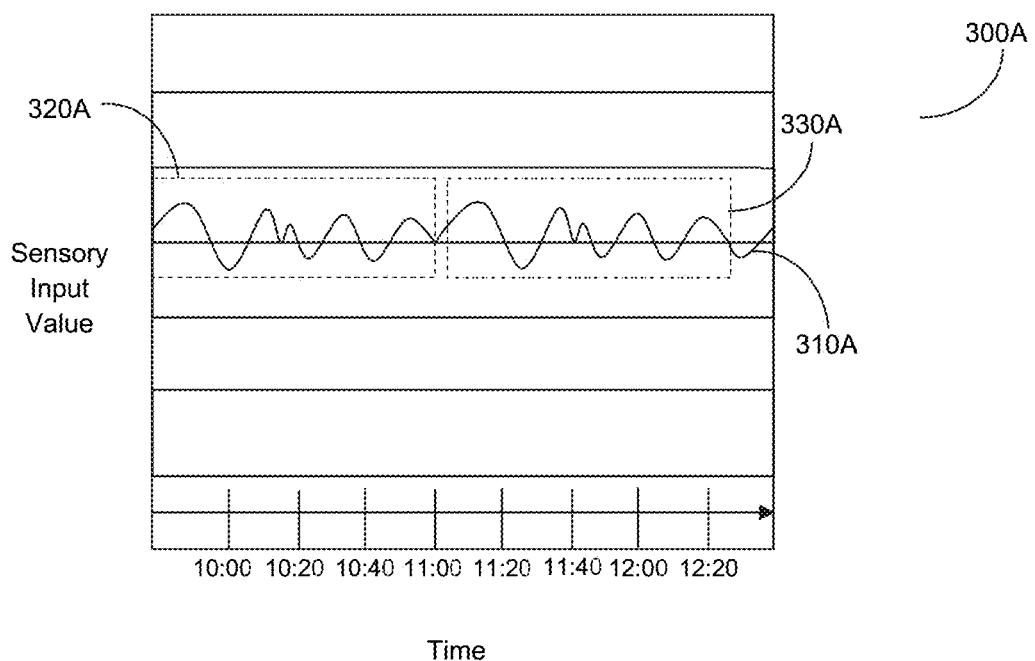
FIGS. 3A and 3B are simulations illustrating modeling of sensory inputs.

FIG. 3A is an example simulation illustrating determining behavioral patterns implemented according to an embodiment. The simulation shown in FIG. 3A includes a graph 300A in which sensory inputs are represented by a curve 310A. In the example simulation shown in FIG. 3, the curve 310A represents an aggregated behavior of the sensory inputs over time. During operation of a machine (e.g., the machine 170, FIG. 1), the aggregated behavior represented by the curve 310A may be continuously monitored for repeated sequences such as repeated sequences 320A and 330A. Upon determination of, for example, the repeated sequence 320A, the repeated sequence 330A, or both, a model of a normal behavior pattern of the machine is generated. It should be noted that continuous monitoring of, e.g., two or more cycles of behavior may be useful for determining more accurate patterns. As monitoring and, consequently, learning, continue, the normal behavior model may be updated accordingly. The models of normal behavior patterns may be utilized to determine root causes of machine failures. As a non-limiting example, if the sequence 320A preceded a machine failure, then the determination of repeated sequence 330A may be predicted to precede a machine failure.

Figure 3B:
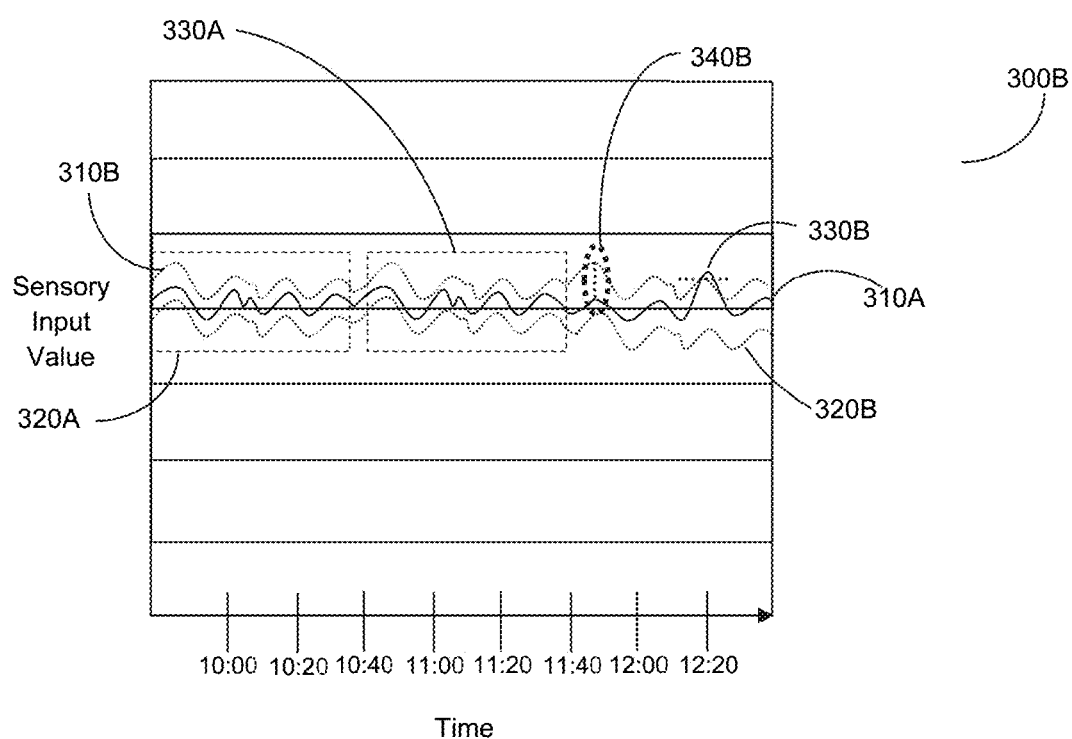

FIG. 3B is an example simulation 300B illustrating generation of adaptive thresholds. Based on one or more repeated sequences (e.g., the repeated sequences 320A and 330A), a maximum threshold 310B and a minimum threshold 320B are determined. The thresholds 310B and 320B may be determined in real-time and regardless of past machine behavior. In an example implementation, the thresholds 310B and 320B are dynamic and adapted based on the sequences 320A and 330A as well as any subsequently determined sequences. The point 330B represents an indicator, i.e., a data point that is above the maximum threshold 310B or below the minimum threshold 320B. Upon determination that one of the thresholds 310B or 320B has been exceeded, an anomaly may be detected.

Figure 4:
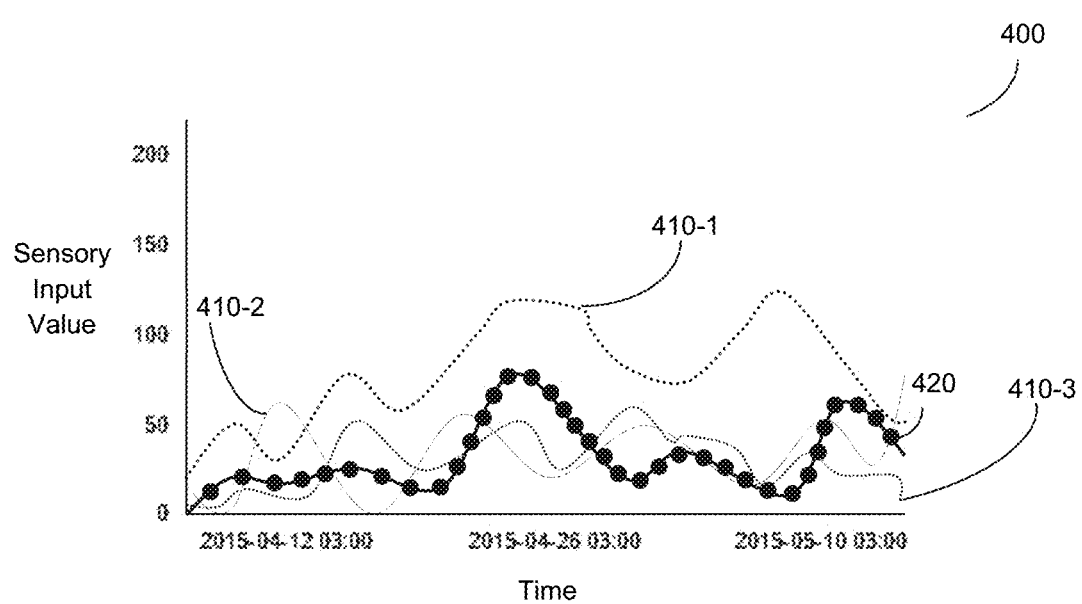
FIG. 4 is a simulation illustrating a general model of a plurality of meta-models.

FIG. 4 is an example simulation 400 illustrating generating a model of a machine based on a plurality of meta-models. In the example simulation 400, a machine (e.g., the machine 170, FIG. 1) including three components is being monitored, where the three components are represented by the meta-models 410-1, 410-2, and 410-3, respectively. The meta-models are based on sensory inputs related to their respective components, and may be utilized to identify anomalies in the operation of each respective component of the machine. Based on the meta-models 410-1 through 410-3, a model 420 that is an optimal representation of the machine may be generated.

Figure 5:
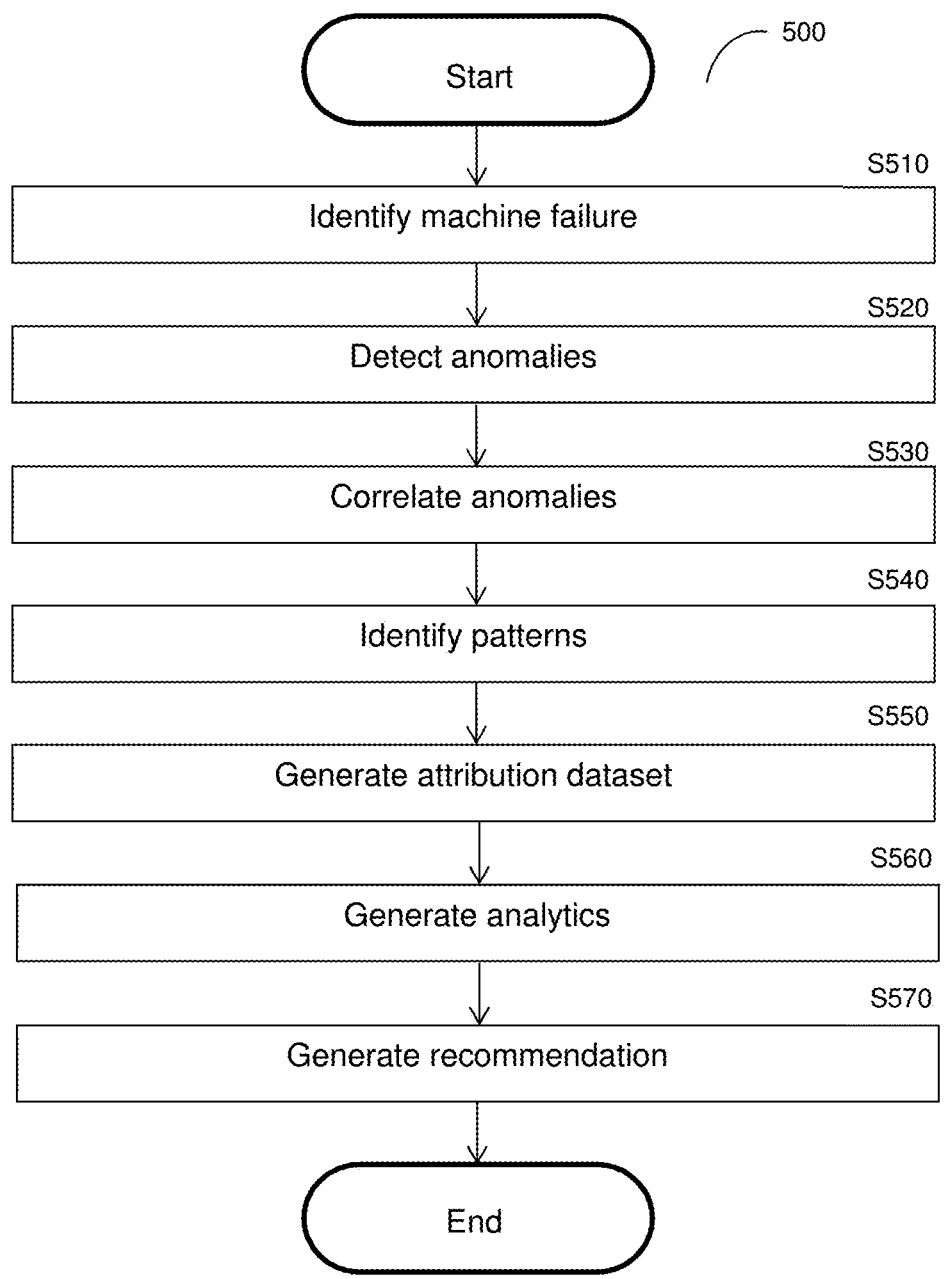
FIG. 5 is a flowchart illustrating a method for unsupervised root cause analysis of machine failures according to an embodiment.

FIG. 5 is an example flowchart 500 illustrating a method for unsupervised prediction of machine failures according to an embodiment. In an embodiment, the method may be performed by the root cause analyzer 140.

At optional S510, a machine failure may be identified. The machine failure may be identified via unsupervised machine learning analysis of monitored sensory inputs related to the machine. In another embodiment, S510 may include receiving a notification indicating a machine failure.

In an embodiment, S510 may further include identifying a type of the machine failure. Identifying the type of failure may include, but is not limited to, identifying one or more anomalies indicating failure, sending a notification prompting a user to provide an indication of the type of failure, retrieving the type of failure from a system associated with the machine, or a combination thereof.

At S520, at least a portion of sensory inputs related to a machine (e.g., the machine 170) are analyzed to detect anomalies. The analysis may include, but is not limited to, unsupervised machine learning using preprocessed sensory inputs. The outputs of the unsupervised machine learning process includes anomalies. In a further embodiment, S510 may include generating a periodic anomalies map of the detected anomalies. Detecting anomalies based on sensory inputs is described further herein below with respect to FIG. 6.

In an embodiment, S520 may further include extracting or otherwise retrieving the at least a portion of sensory inputs related to the machine. In another embodiment, the at least a portion of sensory inputs related to the machine includes a portion of the sensory inputs that are proximate to the failure. In an embodiment, sensory inputs may be proximate to a failure if, e.g., the inputs were received within a threshold period of time prior to the failure. The threshold time period may be a predetermined threshold. In another embodiment, sensory inputs may be proximate to the failure if the sensory inputs were received after a change in behavioral patterns of sensory inputs but prior to the failure.

At S530, the detected anomalies are correlated. In an embodiment, the detected anomalies may be correlated with respect to each type of sensory input. In a further embodiment, S530 may further include ranking correlated groups of sensory inputs. In another embodiment, S530 may include applying a correlation function using a correlation coefficient such as, but not limited to, the Pearson correlation coefficient, the Kendal correlation coefficient, or the Spearman correlation coefficient.

At S540, patterns in the correlated anomalies are identified. Identifying the patterns may include, but is not limited to, identifying at least one anomalous sequence for each type of sensory input. Each identified anomalous sequence is a sequence that includes a plurality of anomalies and is repeated at least once in the correlated anomalies.

At S550, based on the correlated patterns, an attribution dataset associated with the machine failure is generated. The attribution dataset includes a pattern of sensory inputs leading to the machine failure. To this end, the attribution dataset may include all sensory inputs received during the same time periods in which the at least one anomalous sequence occurred. As an example, if an anomalous sequence was identified beginning at 300 minutes since operation began and ending at 375 minutes since operating began, the attribution dataset may include all sensory inputs received from 300 to 375 minutes after operation began. The attribution dataset may be organized in chronological order.

In an embodiment, the attribution dataset may further include one or more environmental variables related to operation of the machine during the collection of the sensory inputs of the attribution dataset. Example environmental variables may include, but are not limited to, a location of the machine, a runtime of the machine, weather, components or modules of the machine, changes thereto, parallel operation of related (e.g., physically proximate, connected, etc.) machines, and the like. The environmental variables may be utilized to, e.g., generate recommendations for avoiding failures.

At S560, based on the attribution dataset, at least one analytic is generated. The at least one analytic indicates, but is not limited to, a root cause of the failure. The root cause may be, but is not limited to, at least one anomaly that preceded the failure. Specifically, the root cause may include one or more individual anomalies, one or more sets of anomalies, or a combination thereof.

In an embodiment, S560 may include, but is not limited to, correlating among a plurality of sets of sensory inputs (e.g., sets of sensory inputs from different sensors, for different components, or both). In a further embodiment, the correlation may be with respect to the identified patterns. In yet a further embodiment, the at least one anomaly may be an anomaly occurring proximately (e.g., within a threshold time period) of at least one of the identified patterns. An example for generating analytics based on correlation among sets of inputs is described further herein below with respect to FIG. 8.

At optional S570, based on the at least one analytic, at least one recommendation may be determined. The at least one recommendation may be determined based on the root cause indicated in the at least one analytic and, e.g., one or more predetermined rules. The at least one recommendation may be further determined based on the environmental variables. As a non-limiting example, when it is determined that an anomaly is related to the failure and that the weather changed within a predetermined time period before the anomaly occurred, the analytics may indicate that the failure was related to the anomaly and that the failure may be due to the change in weather prior to the anomaly.

At optional S580, the attribution dataset, the analytics, the recommendations, or a combination thereof, may be stored in a data storage (e.g., the database 150, FIG. 1).

Figure 6:
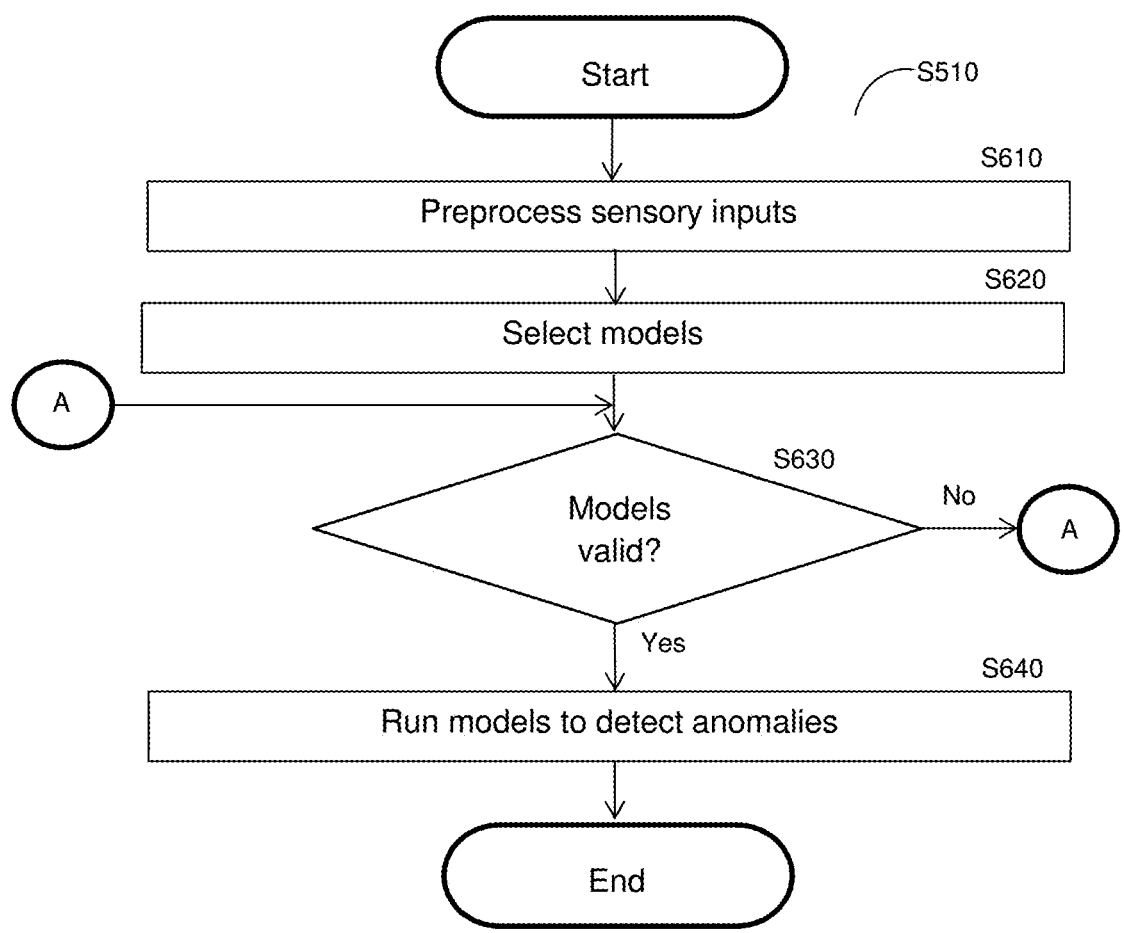
FIG. 6 is a flowchart illustrating a method for unsupervised detection of anomalies according to an embodiment.

FIG. 6 is an example flowchart S510 illustrating a method for detecting anomalies based on sensory inputs according to an embodiment.

At S610, sensory inputs from at least one sensor associated with a machine are preprocessed. In an embodiment, S610 may further include retrieving raw sensory data, and extracting features from the raw sensory data. The extracted features may include, but are not limited to, a reduced-dimension subset of the raw sensory data. In another embodiment, S610 may further include de-trending, rescaling, noise filtering, or a combination thereof.

At S620, at least one model is selected. Each model is selected for one of the parameters represented by the preprocessed sensory inputs. Selecting the models may include computing optimization of models for each parameter.

At optional S630, it may be determined whether the selected models are validated and, if so, execution continues with S640; otherwise, execution continues with S620. In an embodiment, S630 may include injecting randomized anomalies into a dataset, running each selected model using the dataset with the injected randomized anomalies, and calculating accuracy measures based on the injected anomalies run of each model.

At S640, the selected models are run and monitored to detect anomalies. In an embodiment, S640 may include generating an anomalies map. In an embodiment, S640 may further include generating at least one normal behavior pattern based on the running of the selected models. The normal behavior models utilized to generate the anomalies map may be created as described further herein above with respect to FIGS. 3A-3B and 4. In another embodiment, S640 may further include generating, in real-time, at least one adaptive threshold. The generated adaptive thresholds may be utilized to determine anomalous data points.

The detected anomalies may include, but are not limited to, point anomalies, contextual anomalies, and collective anomalies. A point anomaly includes a single data point that is above or below a threshold (e.g., an adaptive threshold as described herein above with respect to FIGS. 3A and 3B) difference with respect to all other data points. A contextual anomaly includes one or more data points that deviate from normal behavior within a given context (e.g., a particular period of time). A collective anomaly includes a plurality of data points that deviate from normal behavior of other groupings of data points.

Figure 7:
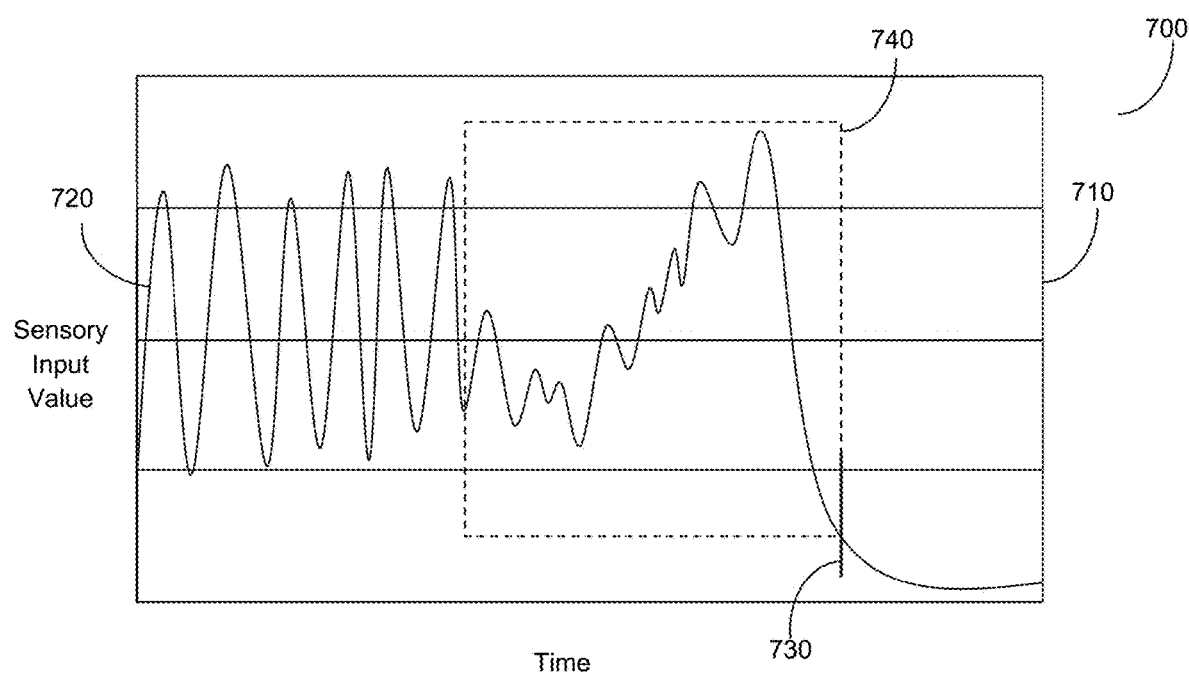
FIG. 7 is a simulation of an attribution dataset associated with a failure.

FIG. 7 is an example simulation 700 utilized to illustrate generation of an attribution dataset. In the example simulation 700, a graph 710 is shown in which sensory inputs are represented by a curve 720. The curve 720 represents aggregated behavior of the sensory inputs over time. The aggregated behavior may be continuously monitored to identify failures. When a failure is identified via the monitoring or a notification indicating a failure is received at the time 730, the sensory inputs of the curve 720 are analyzed to identify a set of sensory inputs 740 resulting in the failure. Specifically, the set of sensory inputs 740 includes sensory inputs received after a change in behavior patterns of the curve 720. The change in behavior patterns may be determined based on, e.g., at least one behavior pattern change rule. An attribution dataset is generated based on the set of sensory inputs 740.

Figure 8:
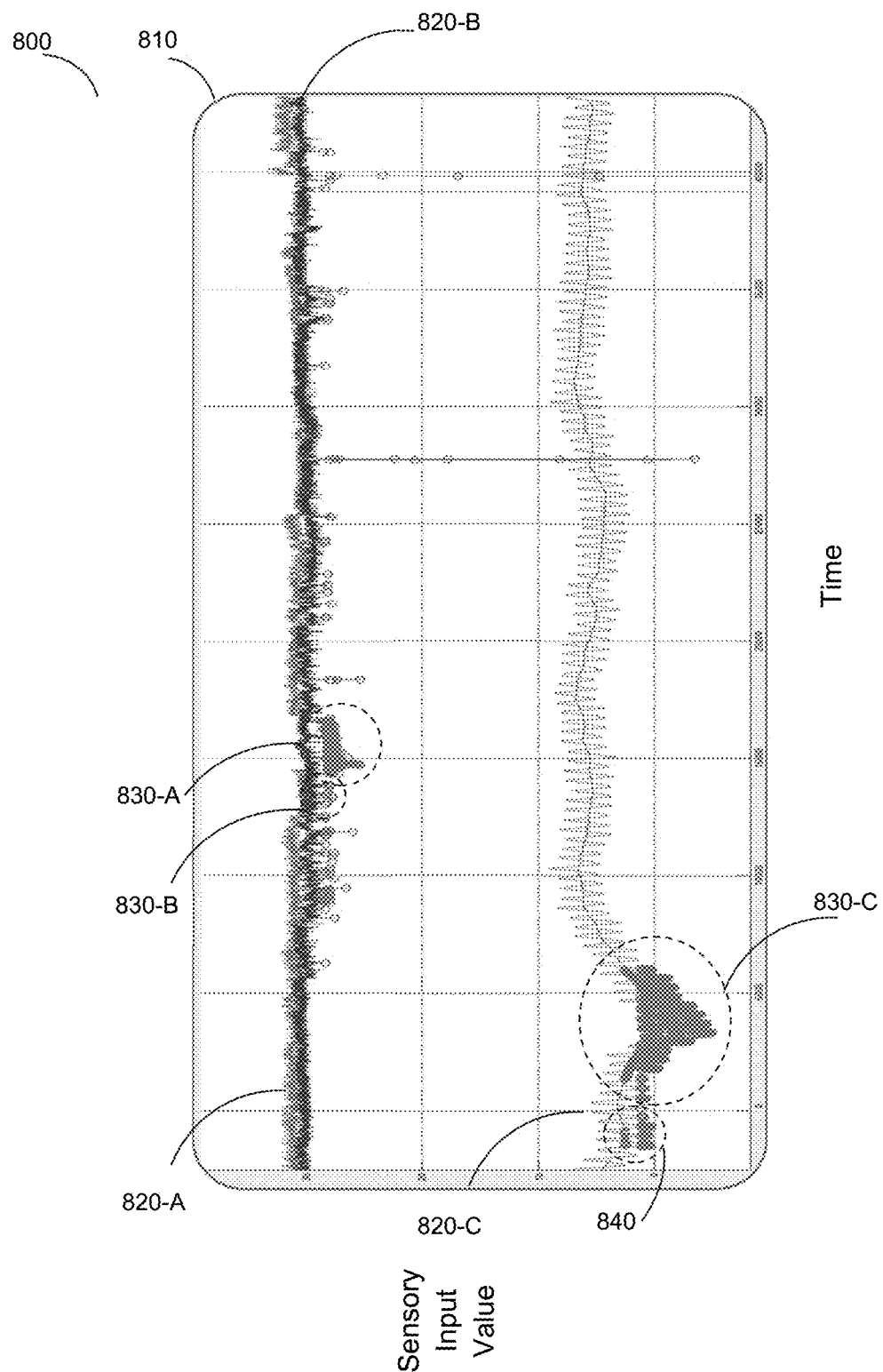
FIG. 8 is another simulation of an attribution dataset associated with a failure.

FIG. 8 is an example simulation 800 illustrating root cause analysis. In the example simulation 800, a machine (e.g., the machine 170, FIG. 1) is monitored such that sensory inputs related to the machine are continuously received. In the example simulation 800, a graph 810 in which sensory inputs represented by curves 820-A, 820-B, and 820-C is shown. Each of the curves 820-A, 820-B, and 820-C reflects an aggregated behavior of sensory inputs collected over time. Patterns of anomalies identified in the sensory inputs are correlated to identify correlative relationships between the curves 820-A, 820-B, and 820-C.

As seen in the graph 810, there are correlations among the curves 820-A, 820-B- and 820-C such that anomalies in the curves 820-A and 820-B precede anomalies in the curve 820-C. When a failure is identified as represented by an anomaly 830-C in the curve 820-C, the anomaly 830-C is analyzed to determine a root cause of the failure. Outlier sensory inputs 840 are determined to be related to the root cause of the failure based on, e.g., its proximity to the appearance of the anomaly 830-C. An analytic indicating the outlier 840 as the root cause is generated.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for unsupervised root cause analysis of machine failures, comprising:
   selecting at least one unsupervised machine learning model based on a plurality of sensory inputs leading to a machine failure, wherein each unsupervised machine learning model is selected for a respective parameter represented by at least one of the plurality of sensory inputs;
   analyzing, via at least unsupervised machine learning, the plurality of sensory inputs leading to the machine failure when the machine failure is identified, wherein the output of the unsupervised machine learning includes at least one anomaly, wherein analyzing the plurality of sensory inputs further comprises running the selected at least one unsupervised machine learning model;
   identifying, based on the output at least one anomaly, at least one pattern;
   generating, based on the at least one pattern and the sensory inputs, an attribution dataset, the attribution dataset including a plurality of the sensory inputs leading to the machine failure; and
   generating, based on the attribution dataset, at least one analytic, wherein the at least one analytic includes at least one root cause anomaly representing a root cause of the machine failure.

2. The method of claim 1, wherein the plurality of sensory inputs leading to the machine failure include sensory inputs received during occurrence of at least one anomalous sequence of the output at least one anomaly.

3. The method of claim 1, wherein the attribution dataset further includes at least one environmental variable related to operation of the machine.

4. The method of claim 3, further comprising:
   generating, based on the at least one analytic and at least one recommendation rule, a recommendation for avoiding future machine failures.

5. The method of claim 1, further comprising:
   correlating, for each type of sensory input of the monitored sensory inputs, at least one of the at least one anomaly, wherein the at least one pattern is identified further based on the correlation.

6. The method of claim 1, wherein analyzing the monitored sensory inputs further comprises:
   preprocessing the plurality of sensory inputs, wherein the preprocessing includes extracting at least one feature from raw sensory data.

7. The method of claim 1, further comprising:
   generating, based on the at least one anomaly, an anomalies map.

8. The method of claim 1, further comprising:
   generating, based on the running of the selected at least one unsupervised machine learning model, a normal behavior pattern, wherein the at least one anomaly deviates from the normal behavior pattern.

9. The method of claim 1, wherein the plurality of sensory inputs leading to the machine failure are any of: received within a threshold period of time of the machine failure, and received after a change in behavioral patterns of the sensory inputs and before the machine failure.

10. A non-transitory computer readable medium having stored thereon instructions for causing a processing circuitry to perform a process, the process comprising:
    selecting at least one unsupervised machine learning model based on a plurality of sensory inputs leading to a machine failure, wherein each unsupervised machine learning model is selected for a respective parameter represented by at least one of the plurality of sensory inputs;
    analyzing, via at least unsupervised machine learning, the plurality of sensory inputs leading to the machine failure when the machine failure is identified, wherein the output of the unsupervised machine learning includes at least one anomaly, wherein analyzing the plurality of sensory inputs further comprises running the selected at least one unsupervised machine learning model;
    identifying, based on the output at least one anomaly, at least one pattern;
    generating, based on the at least one pattern and the sensory inputs, an attribution dataset, the attribution dataset including a plurality of the sensory inputs leading to the machine failure; and
    generating, based on the attribution dataset, at least one analytic, wherein the at least one analytic includes at least one root cause anomaly representing a root cause of the machine failure.

11. A system for unsupervised prediction of machine failures, comprising:
    a processing circuitry; and
    a memory, the memory containing instructions that, when executed by the processing circuitry, configure the system to:
    select at least one unsupervised machine learning model based on a plurality of sensory inputs leading to a machine failure, wherein each unsupervised machine learning model is selected for a respective parameter represented by at least one of the plurality of sensory inputs;
    analyze, via at least unsupervised machine learning, the plurality of sensory inputs leading to the machine failure when the machine failure is identified, wherein the output of the unsupervised machine learning includes at least one anomaly, wherein analyzing the plurality of sensory inputs further comprises running the selected at least one unsupervised machine learning model;
    identify, based on the output at least one anomaly, at least one pattern;
    generate, based on the at least one pattern and the sensory inputs, an attribution dataset, the attribution dataset including a plurality of the proximate sensory inputs leading to the machine failure; and
    generate, based on the attribution dataset, at least one analytic, wherein the at least one analytic includes at least one root cause anomaly representing a root cause of the machine failure.

12. The system of claim 11, wherein the plurality of sensory inputs leading to the machine failure include sensory inputs received during occurrence of at least one anomalous sequence of the output at least one anomaly.

13. The system of claim 11, wherein the attribution dataset further includes at least one environmental variable related to operation of the machine.

14. The system of claim 13, wherein the system is further configured to:
   generate, based on the at least one analytic and at least one recommendation rule, a recommendation for avoiding future machine failures.

15. The system of claim 11, wherein the system is further configured to:
   correlate, for each type of sensory input of the monitored sensory inputs, at least one of the at least one anomaly, wherein the at least one pattern is identified further based on the correlation.

16. The system of claim 11, wherein the system is further configured to:
   preprocess the plurality of sensory inputs, wherein the preprocessing includes extracting at least one feature from raw sensory data.

17. The system of claim 11, wherein the system is further configured to:
   generate, based on the at least one anomaly, an anomalies map.

18. The system of claim 11, wherein the system is further configured to:
   generate, based on the running of the selected at least one unsupervised machine learning model, a normal behavior pattern, wherein the at least one anomaly deviates from the normal behavior pattern.

\* \* \* \* \*